US009110415B2

(12) United States Patent
Moorlag et al.

(10) Patent No.: US 9,110,415 B2
(45) Date of Patent: Aug. 18, 2015

(54) FUSER MEMBER

(75) Inventors: Carolyn P. Moorlag, Mississauga (CA); Yu Qi, Oakville (CA); Brynn M. Dooley, Toronto (CA); Qi Zhang, Milton (CA)

(73) Assignee: Xerox Corporation, Norwalk, CT (US)

( * ) Notice: Subject to any disclaimer, the term of this patent is extended or adjusted under 35 U.S.C. 154(b) by 443 days.

(21) Appl. No.: 13/446,224

(22) Filed: Apr. 13, 2012

(65) Prior Publication Data

US 2013/0274383 A1 Oct. 17, 2013

(51) Int. Cl.
*C08L 1/00* (2006.01)
*G03G 15/20* (2006.01)

(52) U.S. Cl.
CPC .................................. *G03G 15/2057* (2013.01)

(58) Field of Classification Search
USPC ............................................ 524/35; 399/333
See application file for complete search history.

(56) References Cited

U.S. PATENT DOCUMENTS 5,230,937 A 7/1993 Effenberger et al.
6,248,813 B1 * 6/2001 Zehner ............................ 524/13
6,521,332 B2 * 2/2003 Ciaschi et al. ............. 428/304.4
7,252,873 B2 * 8/2007 Ferrar et al. .................. 428/220
2006/0165974 A1 * 7/2006 Ferrar et al. .................. 428/335
2010/0002282 A1 1/2010 Agrawal et al.
2010/0230629 A1 9/2010 Yu et al.
2011/0159276 A1 * 6/2011 Chen et al. .................... 428/336
2012/0077000 A1 * 3/2012 Putnam et al. ................ 428/207
2012/0177719 A1 * 7/2012 Dao et al. ...................... 424/444
2012/0282003 A1 * 11/2012 Halfyard et al. .............. 399/333
2013/0272763 A1 10/2013 Moorlag et al.
2013/0274383 A1 10/2013 Moorlag et al.
2013/0274384 A1 10/2013 Moorlag et al.

FOREIGN PATENT DOCUMENTS

EP 0614773 A1 3/1993

OTHER PUBLICATIONS

Habibi, et al., Cellulose Nanocrystals: Chemistry, Self-Assembly, and Applications, Chem. Rev. 2010, 110, 3479-3500.
U.S. Appl. No. 13/446,227, Office Action dated Apr. 8, 2014.
U.S. Appl. No. 13/446,227, Notice of Allowance and Fees Due dated Sep. 25, 2014.

* cited by examiner

*Primary Examiner* — Peter D Mulcahy
*Assistant Examiner* — Henry Hu
(74) *Attorney, Agent, or Firm* — Hoffman Warnick LLC

(57) ABSTRACT

The present teachings provide a fuser member. The fuser member comprises a release layer comprising microcrystalline cellulose particles dispersed in a fluoropolymer.

9 Claims, 4 Drawing Sheets

FUSER MEMBER

CROSS REFERENCE TO RELATED APPLICATIONS

This application relates to commonly assigned copending application Ser. No. 13/446,227, filed simultaneously herewith and incorporated by reference in its entirety herein.

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

In the electrophotographic printing process, a toner image can be fixed or fused upon a support (e.g., a paper sheet) using a fuser roller. Conventional fusing technologies apply release agents/fuser oils to the fuser roller during the fusing operation in order to maintain good release properties of the fuser roller. For example, oil fusing technologies have been used for all high speed products in the entry production and production color market.

While perfluoroalkoxy polymer resin (PFA) is currently used in many topcoat formulations in fuser rollers and belts and provides excellent release of the toner, issues such as surface cracking, denting, and delamination limit the lifetime of PFA rollers and belts. It would be desirable to find a material combination for fuser rollers and belts that mitigates surface cracking, denting and delamination while providing excellent release.

In addition, in oil-less fusing, waxy toner is often used to aid release of the toner image. However, wax can be transferred to the fuser surface (e.g., polytetrafluoroethylene (PTFE) or Teflon®) and thus contaminate the fuser surface when using the conventional PTFE surface. For example, one failure mode for PTFE oil-less fuser is called wax ghosting. The wax on the PTFE affects the image quality of the next print. It would be desirable to have a material combination that mitigates this problem.

There is a need in certain fusing applications to provide options for level of gloss on prints. There is additionally a desire to incorporate components based on renewable resources into printing components and consumables to lessen environmental impact and reliance of petroleum-derived materials, reduce cost as well as improve options for biodegrading and/or recycling.

SUMMARY

According to an embodiment, a fuser member is provided. The fuser member comprises a release layer comprising microcrystalline cellulose particles dispersed in a fluoropolymer.

According to another embodiment, there is described a fuser member comprising a substrate, a resilient layer disposed on the substrate; and a release layer. The release layer comprises a composite of a fluoropolymer and microcrystalline cellulose particles. According to another embodiment there is provided a fuser member. The fuser member comprises a substrate, a resilient layer and a release layer. The resilient layer comprises silicone and is disposed on the substrate. The release layer is disposed on the resilient layer. The release layer comprises a composite of a fluoropolymer selected from the group consisting of polytetrafluoroethylene and perfluoroalkoxy polymer resin, and microcrystalline cellulose particles comprising the structure:

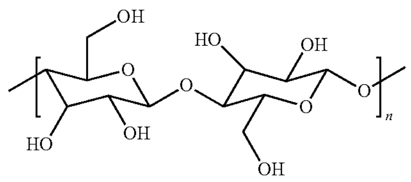

wherein n is from about 200 to about 4000, and wherein the microcrystalline particles comprise from about 1 weight percent to about 10 weight percent of the release layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
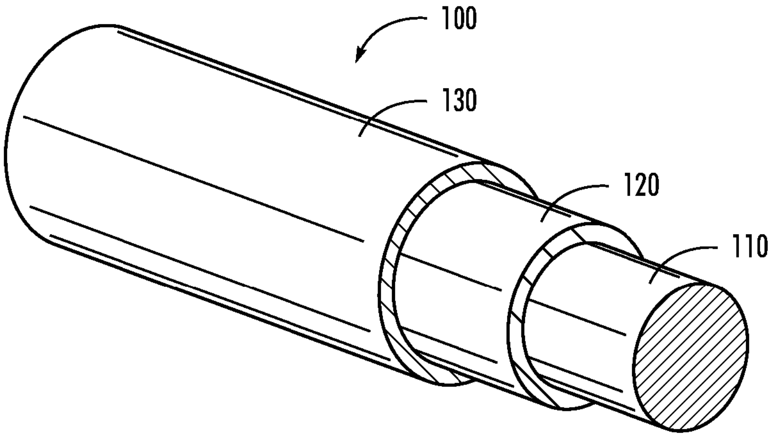
FIG. 1 depicts an exemplary fuser member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

In various embodiments, a fixing member can include, for example, a substrate, with one or more functional layers formed thereon. The substrate can be formed in various shapes, e.g., a cylinder (e.g., a cylinder tube), a cylindrical drum, a belt, a drelt (a cross between a drum and a belt), or a film, using suitable materials that are non-conductive or conductive depending on a specific configuration, for example, as shown in FIGS. 1 and 2.

Figure 2:
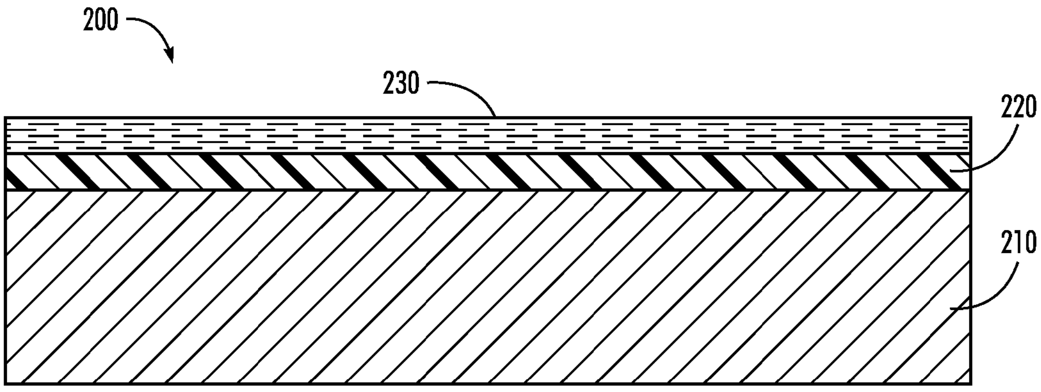
FIG. 2 depicts an exemplary fusing member having a belt substrate in accordance with the present teachings.

Specifically, FIG. 1 depicts an exemplary embodiment of a fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 and a release layer 130 formed thereon. The release layer 130 will be described in more detail below. The release layer 130 has a thickness of from about 5 microns to about 250 microns, or from about 10 microns to about 150 microns, or from about 15 microns to about 50 microns. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an release layer 230 formed thereon. The release layer 230 or outer surface comprises microcrystalline cellulose particles dispersed in a fluoropolymer. The release layer 230 has a thickness of from about 5 microns to about 250 microns, or from about 10 microns to about 150 microns, or from about 15 microns to about 50 microns.

Substrate

The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes), metal materials (e.g., aluminum or stainless steel) to maintain rigidity and structural integrity as known to one of ordinary skill in the art.

Functional Intermediate Layer

Examples of materials used for the functional intermediate layer 220 (also referred to as cushioning layer, resilient layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional intermediate layer 220 also include fluoroelastomers. Fluoroelastomers are from the class of 1) copolymers of two of vinylidenefluoride, hexafluoropropylene, and tetrafluoroethylene; such as those known commercially as VITON A® 2) terpolymers of vinylidenefluoride, hexafluoropropylene, and tetrafluoroethylene those known commercially as VITON B®; and 3) tetrapolymers of vinylidenefluoride, hexafluoropropylene, tetrafluoroethylene, and cure site monomer those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF®, NM® FOR-THF®, FOR-TFS® TH® NH®, P757® TNS®, T439 PL958® BR9151® and TN505, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 is from about 30 microns to about 1,000 microns, or from about 100 microns to about 800 microns, or from about 150 microns to about 500 microns. Fillers may be present in the intermediate layer to modify the mechanical strength, or to adjust thermal conductivity. Filler particles that may be present include carbon black particles, graphite particles, iron oxide, aluminum oxide, or other conductive or reinforcing metal oxide particles.

Adhesive Layer(s)

Optionally, any known and available suitable adhesive layer, also referred to as a primer layer, may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the release layer, to a thickness of from about 2 nanometers to about 2,000 nanometers, or from about 2 nanometers to about 500 nanometers. The adhesive can be coated by any suitable known technique, including spray coating or wiping.

Figure 3A:
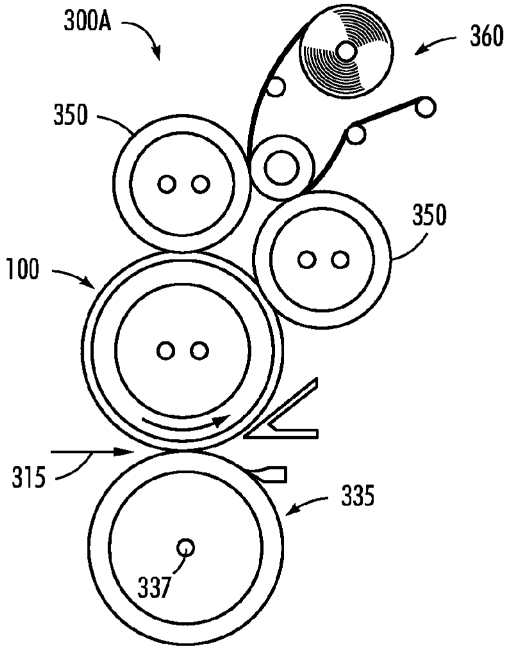
FIGS. 3A-3B depict exemplary fusing configurations using the fuser members shown in FIG. 1 in accordance with the present teachings.
Figure 3B:
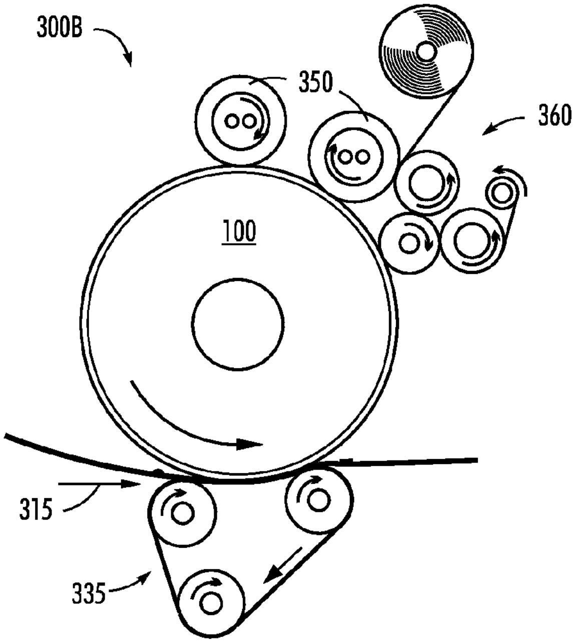
Figure 4A:
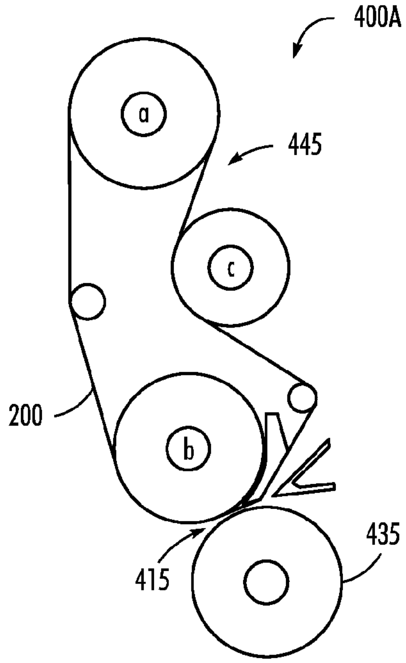
FIGS. 4A-4B depict other exemplary fusing configurations using the fuser belt shown in FIG. 2 in accordance with the present teachings.
Figure 4B:
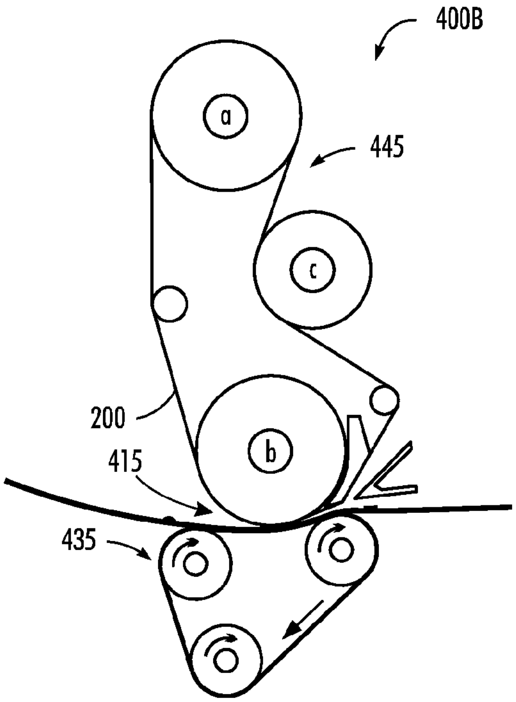

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser member shown in FIG. 1 in accordance with the present teachings. The configurations 300A-B can include a fuser member 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fuse the toner particles and forming images on the media substrate 415. The mechanical system 445 can include one or more rollers 445*a-c*, which can also be used as heat rollers when needed.

Figure 5:
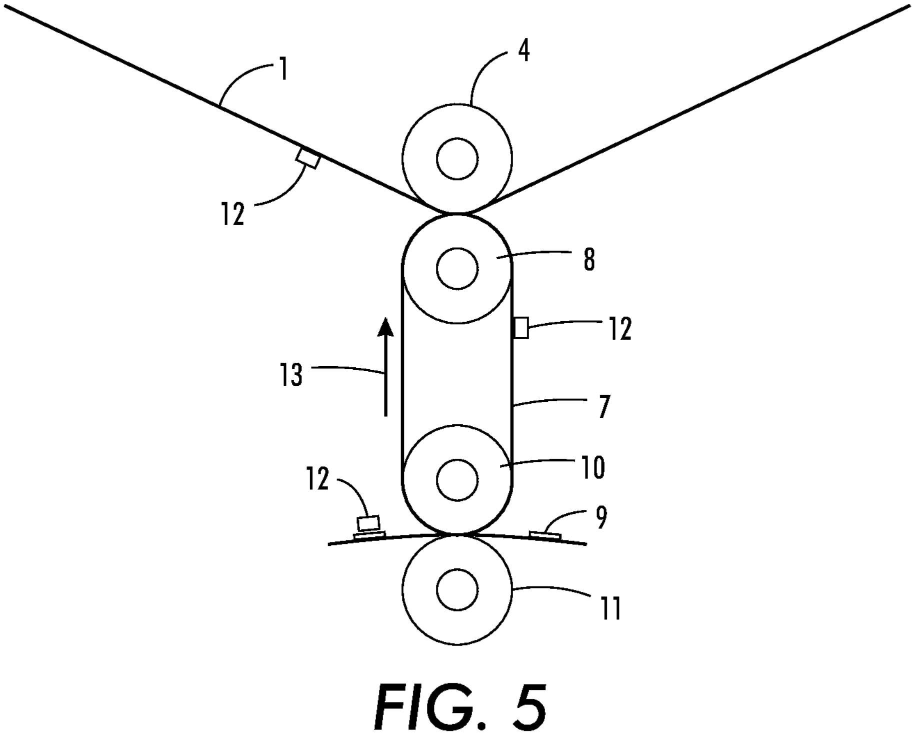
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Release Layer

An exemplary embodiment of a release layer 130, 230 includes a fluoropolymer having dispersed therein microcrystalline cellulose particles. Microcrystalline cellulose (MCC) particles are highly crystalline, thermally stable particles that may be used to reinforce and strengthen, as well as texturize polymeric composites. The functional groups present on the exterior of microcrystalline cellulose allow for the functionalization with hydrophobic/fluorinated groups, to optimize processing and compatibility with fluoropolymers. The incorporation of microsized crystalline cellulosic particles into composites has the added benefit of ability to source renewable, widely available materials requiring low energy consumption, that are biodegradable.

Microcrystalline cellulosic fibers and particles are of interest for the preparation of biocomposite materials for various applications due to the availability and renewability of pulp fibers (wood, or other) that are used as sources of cellulosic reinforcing materials. Some general applications for microcrystalline cellulose (MCC) particles are generally as emulsifiers, bulking agents, or texturizers, and specifically in vitamin tablets and pill capsules. In biological applications, MCC is especially useful to yield materials of high strength and flexibility that are non-toxic and biodegradable. MCC particles are formed of primary chains of $C_6H_{10}O_5$ D-glucose units, linked together by β (C1→C4) linkages as shown below:

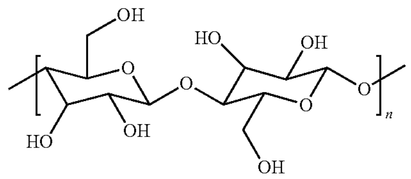

β (C1→C4) Linkage wherein the value of n is a range between about 200 to about 8000, or about 500 to about 3000, or from about 1000 to about 2000. Cellulose chains comprising microscrystalline cellulose particles may contain residual functional groups. One example of residual functional groups bonded to cellulose chains are esters such as acetate ester, propionate ester, nitrate ester, and sulfate ester. Another example of residual functional groups bonded to cellulose chains are ethers such as methyl ethers, ethyl ethers, ethyl hydroxide, and propyl hydroxide.

Microcrystalline cellulose is prepared from a special grade of α-cellulose whereby mineral acid is used to cleave amorphous portions, leaving mainly crystalline regions. Crystalline regions are formed by hydrogen bonding across and between cellulose strands. Microcrystalline cellulose particles can be highly crystalline, are within the micron size regime of from about 1 micron to about 500 microns, and can have high thermal stability. High thermal stability of the release layer is necessary for fusing applications, as well as for processing steps required for the preparation of a fluoropolymer composite. Highly crystalline microcrystalline cellulose will begin to break down at ~320° C., with the onset of thermal degradation being highly dependent on purity and crystallinity of the cellulose strands. This thermal stability is within the range of fusing temperatures.

The advantages of reinforcing a fluoropolymer topcoat with microcrystalline cellulose include, but not limited to, the low density and compressibility of the microcrystalline particles. Bulk density of MCC particles used is from about 0.1 g/mL to about 0.8 g/mL, or from about 0.1 g/mL to about 0.6 g/mL, or from about 0.2 g/mL to about 0.4 g/mL. MCC particles have a true density of about 0.8 g/mL to about 2.5 g/mL, or from about 1 g/mL to about 2 g/mL, or from about 1.3 g/mL to about 1.8 g/mL. The MCC particles may be dispersed with efficient mixing techniques into a fluoropolymer matrix. The low density allows for a low weight percentage of the MCC particles in the release layer formulation. The weight percentage of MCC particles is from about 1.0 weight percent to about 10 weight percent, or from about 1.5 weight percent to about 8 weight percent or from about 2.0 weight percent to about 7 weight percent of the release layer.

Cellulosic materials are derived from renewable, widely available sources and may be processed with little energy. In addition, MCC particles are biodegradable. MCC particles vary in size and shape. For fusing applications the useful size range is from about 1 micron to about 50 microns, or from about 2 microns to about 30 microns, or from about 3 microns to about 10 microns. MCC can be in the form of spheres, ovals, needles, flakes, or other irregular shapes. The size and shapes of MCC particles used affect improve interaction properties such as release of toner and contaminants. Regular shapes and distribution across the release layer surface will improve release. Gloss characteristics are also changed due to the size and shapes of MCC particles. Decrease in gloss of low variance is achieved with even distribution of MCC particles that are more regular in shape, such as spheres or ovals. Needles, flakes, or other irregular shapes may be used to prepare surfaces enabling very low gloss prints. The compressibility of MCC incorporated into a release layer improves tensile strength and overall mechanical properties, to enable layer robustness and longer life of the fuser member. The surface groups of cellulose strands of MCC allow for chemical functionalization or addition of surfactants in order to tailor processing, wetting, or compatability with the polymer matrix. An alkaline additive may be used as a dispersant for MCC during processing. Examples of chemical functionalization of MCC include functionalization with alkyl or benzyl amines, imines, halides, alkoxides, hydroxides, acid halides, or siloxyhalides. Examples of chemical surfactants used to modify surface properties of MCC include ammonium salts such as alkyl or aryl quaternary ammonium halide salts; alkyl or aryl amines; phosphates, phosphate esters, sulfonates, carboxylates, or additional functional surfactants. Functionalization on cellulose strands may be present in ratios of from about 1 percent to about 30 percent of glucose units, or from about 5 percent to about 20 percent of glucose units, or from about 10 percent to about 15 percent of glucose units.

Fluoropolymers suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymers include polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer, and mixtures thereof. The fluoropolymers provide chemical and thermal stability and have a low surface energy.

Fluoropolymers are characterized as fluoroplastics or fluoroelastomers. Fluoroplastic have a melting temperature of from about 255° C. to about 360° C. or from about 280° C. to about 330° C. Fluoroplastic include polytetrafluoroethylene (PTFE) and perfluoroalkoxy polymer resin (PFA). Fluoroplastic particles are melted to form the release layer. Fluoroelastomer are cured at elevated temperatures to form a release layer. Fluoroelastomers are cured at temperatures of from about 150° C. to about 250° C.

For the fuser member 200, the thickness of the outer surface layer or release layer 230 can be from about 5 microns to about 250 microns, or from about 10 microns to about 150 microns, or from about 15 microns to about 50 microns.

Embodiments described herein provide the use of microcrystalline cellulose particles incorporated into fluoropolymer composites as a fuser topcoat to texturize and reinforce the surface.

The MCC particles and fluoropolymer composite release layer is resistant to surface damage. The surface is less prone to scratch when a tip of a harder material than the surface layer is dragged across the release layer surface. The surface is less prone to denting or compression defects arising from a force applied downward from the surface. Damage of this type is common for fuser members during regular handling and use, and such damage limits the usable life of fuser members. It is advantageous to develop a release layer surface that is resilient to denting or compression defects to extend fuser member lifetime.

The microcrystalline cellulose particle-reinforced fluoropolymer composite materials can have a tensile strength ranging from about 500 psi to about 5000 psi, or from about 1200 psi to about 2200 psi, or from about 1400 psi to about 1800 psi; a toughness ranging from about 500 in-lbs/in$^3$ to about 5000 in-lbs/in$^3$, or from about 1500 in.-lbs/in$^3$ to about 4000 in-lbs/in$^3$, or from about 2400 in-lbs/in$^3$ to about 3000 in-lbs/in$^3$; and an initial modulus ranging from about 400 psi to about 3000 psi, or from about 500 psi to about 2000 psi, or from about 600 psi to about 1000 psi. In embodiments, the above-described mechanical properties can be measured using the ASTM D412 method as known in the art.

Additives and additional conductive or non-conductive fillers may be present in the above-described composition of fluoropolymer particles MCC particles. In various embodiments, other filler materials or additives including, for example, inorganic particles, can be used for the coating composition and the subsequently formed surface layer. Conductive fillers used herein include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly (fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials. Fillers may be added from about 0 weight percent to about 10 weight percent, or from about 0 weight percent to about 5 weight percent, or from about 1 weight percent to about 3 weight percent.

The disclosed outer surface can be used in oil-less fusing processes to assist toner release and paper stripping, as well as to improve toner design.

Such oil-less fusing can provide many more advantages. For example, the elimination of the entire oil delivering system in a fuser system can provide lower manufacture cost, lower operating cost (e.g., due to no oil-replenishment), simpler subsystem design and lighter weight. In addition, an oil-free fusing process/operation can overcome, e.g., non-uniform oiling of the fuser that generates print streaks and unacceptable image quality defects, and some machine reliability issues (e.g., frequent breakdown) that generates high service cost and customer dissatisfaction.

A solution or dispersion of microcrystalline cellulose particles and fluoropolymer particles is coated on a substrate in any suitable known manner. The liquid or solvent used as the media for the solution can include water, an alcohol, a $C_5$-$C_{18}$ aliphatic hydrocarbon such as pentane, hexane, heptane, nonane, dodecane and the like, a $C_6$-$C_{18}$ aromatic hydrocarbon such as toluene, o-xylene, m-xylene, p-xylene, and the like, an ether, an ester, a ketone, and an amide. The liquid provides a media for dispersion of fluoropolymer particles and the MCC particles and optional fillers. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like. After the solution is coated the coating is heated to cure the networked coating and melt the fluoropolymer particles.

The microcrystalline cellulose particles and fluoropolymer composite coating may be heat treated in a process to enable cross-linking, melting, or another curing process, whereby the coating is directly heat treated from about 200° C. to about 400° C., or from about 255° C. to about 360° C. or from about 280° C. to about 330° C. for a time of between about 5 minutes to about 30 minutes, or from about 7 minutes to about 20 minutes, or from about 10 minutes to about 15 minutes.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Preparation of Composite Coatings of Fluoroelastomer and Microcrystalline Cellulose Composites of Viton and Microcrystalline Cellulose were prepared by the following procedure: Preparation: 30 g Viton GF (available from E. I. du Pont de Nemours, Inc.) was dissolved in 137.6 g methylisobutyl ketone (MIBK) by overnight milling. 0.076 g microcrystalline cellulose (Flocel® 101, 50%) was added to 8.5 g of the Viton/MIBK solution with stirring for one hour to make uniform dispersion. 0.76 g AO700 crosslinker (aminoethyl aminopropyl trimethoxysilane crosslinker from Gelest) in MIBK solution (10 weight percent AO700) was added to the dispersion with stirring for about 10 minutes before coating. The Viton composite coating containing 5 weight percent of micro crystalline cellulose was prepared by application of the dispersion on an aluminum paper with a 20-mil gap draw-down bar coater and followed by curing cycle to about 218° C.

Following the same procedure of dispersion preparation above, Viton composites containing 10 weight percent and 20 weight percent of microcrystalline cellulose were made on Al paper with the draw-down bar coating and followed by a curing cycle to 218° C.

Observation of composite coatings containing 5, 10, and 20 weight percent MCC by microscope displayed even dispersion of spherical to oval particles both before and after curing. Texture is attained on the surface on the scale of the 50 micron particles. Microcrystalline particles remained intact.

Example 2

Preparation of Composite Coatings of Fluoroplastic and Microcrystalline Cellulose A coating formulation was prepared by dispersing MP320 powder PFA from DuPont (particle size greater thanl5 microns) and three formulations of 5, 10, and 20 weight percent microcrystalline cellulose (Flocel® 101, 50%) in 2-propanol. The total solids loading of particles in 2-propanol is 20 weight percent. Dispersion of the components in 2-propanol is aided by repeated sonnication. Dispersions were sprayed onto a silicone rubber substrate using a Paashe airbrush. The coatings were cured by heat treatment at 350° C. for 15-20 minutes to form a composite film.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:

a substrate;

a resilient layer disposed on the substrate; and a release layer comprising a composite comprising a fluoropolymer and microcrystalline cellulose particles disposed on the resilient layer.

2. The fuser member of claim 1 wherein the microcrystalline cellulose particles comprise the structure:

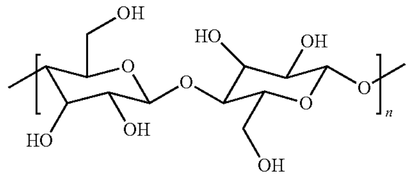

wherein n is from about 200 to about 4000.

3. The fuser member of claim 1, wherein the microcrystalline cellulose particles comprise from about 1 weight percent to about 10 weight percent of the release layer.

4. The fuser member of claim 1, wherein the fluoropolymer is selected from the group consisting of polytetrafluoroethylene (PTFE); perfluorolkoxy polymer resin (PFA); copolymer of tetrafluoroethylene (TFE) and hexafluoropropylene (HFP); copolymers of hexafluoropropylene (HFP) and vinylidene fluoride (VDF); terpolymers of tetrafluoroethylene (TFE), vinylidene fluoride (VDF), and hexafluoropropylene (HFP); and tetrapolymers of tetrafluoroethylene (TFE), vinylidene fluoride (VDF), hexafluoropropylene (HFP) and a cure site monomer.

5. The fuser member of claim 1, wherein the release layer further comprises filler materials selected from the group consisting carbon black, graphite, fullerene, acetylene black, fluorinated carbon black, carbon nanotubes, metal oxides, doped metal oxides, polyanilines, polythiophenes, polyacetylene, poly(p-phenylene vinylene), poly(p-phenylene sulfide), polyindole, polypyrene, polycarbazole, polyazulene, polyazephine, polynaphthalene, salts of organic sulfonic acid, esters of phosphoric acid, esters of fatty acids, ammonium or phosphonium salts and mixture thereof.

6. The fuser member of claim 5, wherein the total filler materials comprise from about 0 weight percent to about 10 percent of the release layer.

7. The fuser member of claim 1, comprising a roller.

8. The fuser member of claim 1, comprising a belt.

9. The fuser member comprising:

a substrate;

a resilient layer disposed on the substrate; and a release layer disposed on the resilient layer, wherein the release layer comprises a composite comprising a fluoropolymer selected from the group consisting of polytetrafluoroethylene and perfluoroalkoxy polymer resin, and microcrystalline cellulose particles having the structure

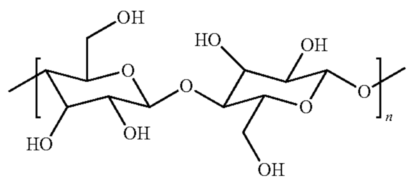

wherein n is from about 200 to about 4000, and wherein the microcrystalline particles comprises from about 1 weight percent to about 10 weight percent of the release layer.

* * * * *